(12) United States Patent
Nakamura et al.

(10) Patent No.: US 10,684,081 B2
(45) Date of Patent: Jun. 16, 2020

(54) FLOW PATH MEMBER

(71) Applicant: KYOCERA CORPORATION, Kyoto-shi, Kyoto (JP)

(72) Inventors: Kiyotaka Nakamura, Kirishima (JP); Masayuki Moriyama, Kirishima (JP); Yuusaku Ishimine, Satsumasendai (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 2 days.

(21) Appl. No.: 15/755,604

(22) PCT Filed: Aug. 26, 2016

(86) PCT No.: PCT/JP2016/075032
§ 371 (c)(1),
(2) Date: Feb. 27, 2018

(87) PCT Pub. No.: WO2017/038700
PCT Pub. Date: Mar. 9, 2017

(65) Prior Publication Data
US 2019/0024991 A1    Jan. 24, 2019

(30) Foreign Application Priority Data
Aug. 28, 2015   (JP) .................................. 2015-169293

(51) Int. Cl.
| | |
|---|---|
| *F28F 21/04* | (2006.01) |
| *C04B 41/80* | (2006.01) |
| *F28F 3/12* | (2006.01) |
| *F28F 1/04* | (2006.01) |
| *F28F 19/02* | (2006.01) |

(52) U.S. Cl.
CPC .............. *F28F 21/04* (2013.01); *C04B 41/80* (2013.01); *F28F 1/04* (2013.01); *F28F 3/12* (2013.01); *F28F 19/02* (2013.01); *F28F 2245/00* (2013.01)

(58) Field of Classification Search
CPC ............... F28F 21/04; F28F 3/12; F28F 19/02
USPC ......................................... 138/141, 146, 145
See application file for complete search history.

(56) References Cited

U.S. PATENT DOCUMENTS

| | | | | |
|---|---|---|---|---|
| 5,004,629 A | * | 4/1991 | Svec ...................... | B22D 41/50 138/141 |
| 2003/0175453 A1 | * | 9/2003 | Steffier .................. | B23P 15/008 428/34.5 |
| 2004/0028941 A1 | * | 2/2004 | Lane ...................... | C04B 41/009 428/689 |

(Continued)

FOREIGN PATENT DOCUMENTS

| | | |
|---|---|---|
| EP | 0661917 A1 | 7/1995 |
| JP | S59-46493 | 3/1984 |

(Continued)

OTHER PUBLICATIONS

International Search Report received for International Application No. PCT/JP2016/075032 dated Sep. 20, 2016, 2 pages.

*Primary Examiner* — James F Hook
(74) *Attorney, Agent, or Firm* — Viering, Jentschura & Partner MBB

(57) ABSTRACT

In the present disclosure, a flow path member includes a substrate, a flow path and a first oxide layer. The substrate contains non-oxide ceramics, and includes an outer surface. The flow path is in the substrate, and includes an inlet and an outlet. The first oxide layer is disposed on the outer surface.

7 Claims, 1 Drawing Sheet

(56) References Cited

U.S. PATENT DOCUMENTS

| | | | |
|---|---|---|---|
| 2007/0138710 A1 | 6/2007 | Fukuyama et al. | |
| 2010/0307730 A1* | 12/2010 | Chiang | F28F 3/12 165/185 |
| 2011/0041515 A1 | 2/2011 | Fraim | |
| 2011/0174412 A1* | 7/2011 | Jebasinski | F01N 3/28 138/145 |
| 2012/0047860 A1* | 3/2012 | Boger | C04B 41/009 55/523 |
| 2012/0160361 A1* | 6/2012 | Fischer | B23K 31/027 138/145 |
| 2014/0272276 A1* | 9/2014 | Drury | C04B 38/0012 428/116 |
| 2015/0231667 A1* | 8/2015 | Krawczyk | F16L 57/06 138/145 |
| 2016/0289844 A1* | 10/2016 | Strock | C04B 41/87 |

FOREIGN PATENT DOCUMENTS

| | | |
|---|---|---|
| JP | 2010-173873 A | 8/2010 |
| JP | 2013-48204 A | 3/2013 |
| KR | 20070026407 A | 3/2007 |
| WO | 2009051735 A2 | 4/2009 |

* cited by examiner

FLOW PATH MEMBER

RELATED APPLICATIONS

The present application is a national stage entry according to 35 U.S.C. § 371 of PCT application No.: PCT/JP2016/075032 filed on Aug. 26, 2016, which claims priority from Japanese application No.: 2015-169293 filed on Aug. 28, 2015 and is incorporated herein by reference in its entirety.

TECHNICAL FIELD

The present disclosure relates to a flow path member.

BACKGROUND

A flow path member constructed of a substrate internally provided with a flow path is customarily used for temperature control on a heat-exchange target, and, the temperature control is effected by contacting between the substrate and the heat-exchange target while passing a low-temperature or high-temperature fluid through the flow path. For example, when using a high-temperature gas as a heat-exchange target, the substrate is arranged so as to contact with the high-temperature gas, and a low-temperature fluid is passed through the flow path to cool down the high-temperature gas. The heat-exchange target is not limited to a gaseous material such as a high-temperature gas, but may be a liquid or solid matter.

Such a flow path member as described above is required to endure long-term use, and therefore, proposed is a flow path member including a substrate that is composed of ceramics having good mechanical characteristics (for example, refer to Japanese Unexamined Patent Publication JP-A 2010-173873).

SUMMARY

In the present disclosure, a flow path member includes a substrate, a flow path and a first oxide layer. The substrate contains non-oxide ceramics, and includes an outer surface. The flow path is in the substrate, and includes an inlet and an outlet. The first oxide layer is disposed on the outer surface.

EMBODIMENTS

Ceramics, while having good mechanical characteristics, may suffer occurrence of a microcrack due to the process for changing a surface texture, such for example as grinding operation for flattening ceramics surface or blasting operation for roughening ceramics surface, which may result in deterioration in mechanical characteristics.

Especially in a flow path member which is a hollow body having a flow path and is thus lower in mechanical characteristic level than a solid body, microcrack-caused deterioration in mechanical characteristics gives rise to lack of reliability. Hence, recent flow path members are required to exhibit mechanical characteristics inherent in ceramics satisfactorily even after the process for changing a surface texture.

Now, a flow path member according to the present disclosure will be described in detail with reference to drawings.

Figure 1:
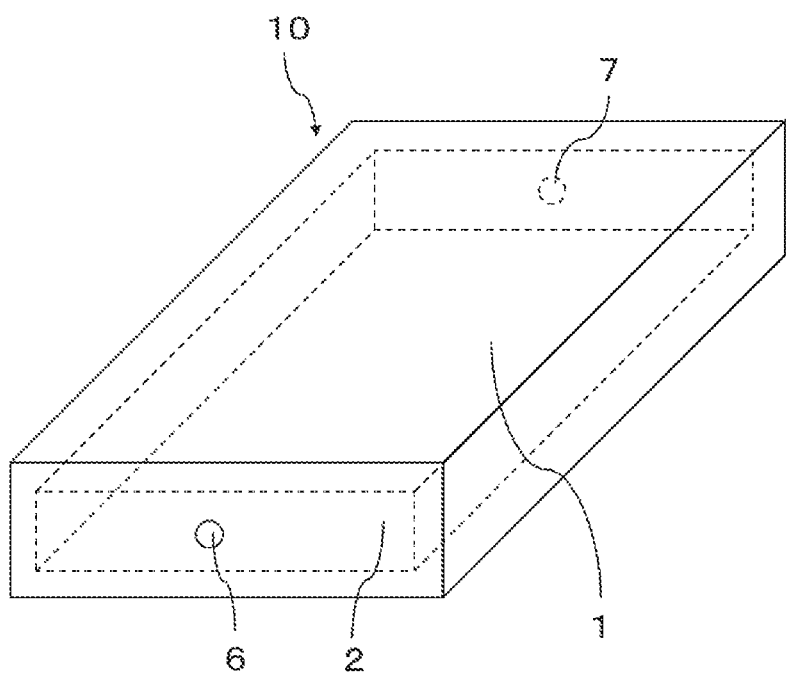
FIG. 1 is a perspective view showing an example of a flow path member according to the present disclosure.
Figure 2:
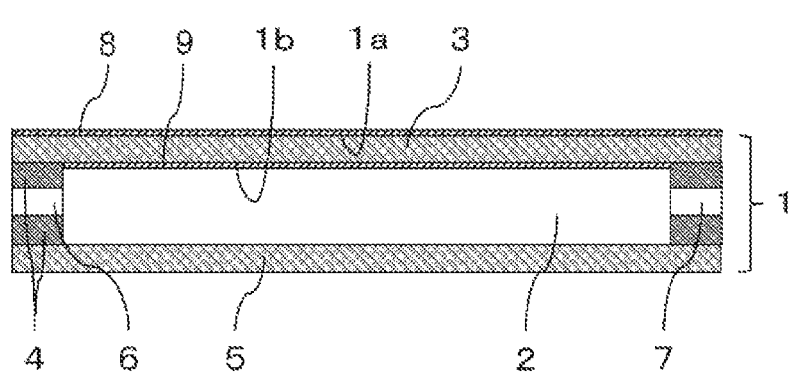
FIG. 2 is a sectional view of the flow path member shown in FIG. 1.

FIG. 1 is a perspective view showing an example of the flow path member according to the present disclosure. Moreover, FIG. 2 is a sectional view of the flow path member shown in FIG. 1.

A flow path member 10 according to the present disclosure comprises a substrate 1 formed of non-oxide ceramics. As shown in FIG. 1, in the flow path member 10 according to the present disclosure, the substrate 1 is internally provided with a flow path 2 having an inlet 6 and an outlet 7. In FIG. 1, as shown in FIG. 2, the substrate 1 is, as exemplified, composed of a lid body 3, a bottom plate 5 located opposite to the lid body 3, and an intermediate plate 4 located between the lid body 3 and the bottom plate 5, and, the flow path 2 is defined by a space surrounded with these constituent components, and the inlet 6 and the outlet 7 are provided as openings in the intermediate plate 4.

As employed herein, non-oxide ceramics refer to silicon carbide ceramics, silicon nitride ceramics, and aluminum nitride ceramics. The silicon carbide ceramics has a silicon carbide content of not less than 75% by mass based on 100% by mass representing the sum total of all the ceramic-constituting components, expressed differently, the silicon carbide ceramics contains silicon carbide as a major constituent. This holds true for other non-oxide ceramics, that is, the silicon nitride ceramics contains silicon nitride as a major constituent, and the aluminum nitride ceramics contains aluminum nitride as a major constituent.

The use of silicon carbide ceramics as the non-oxide ceramic constituting the substrate 1 permits the attainment of good mechanical characteristics, and also permits an increase in heat-exchange efficiency by virtue of high thermal conductivity.

Moreover, the properties of material of construction of the substrate 1 in the flow path member 10 according to the present disclosure can be identified in the following manner. To begin with, the measurement of the substrate 1 is made by an X-ray diffractometer (XRD), and, the value of $2\theta$ ($2\theta$ represents a diffraction angle) thereby obtained is identified in accordance with JCPDS Card. When silicon carbide is identified, quantitative analysis of silicon (Si) content is conducted with use of ICP (Inductively Coupled Plasma) emission spectrophotometer. Then, a conversion calculation of the content of silicon determined by ICP is made to obtain a content of silicon carbide (SiC). When the silicon carbide content obtained by the conversion calculation is not less than 75% by mass, then the target material of the substrate can be determined as silicon carbide ceramics. Also in the cases of the other non-oxide ceramics, the determination process is carried out in a similar manner.

Moreover, an oxygen content in the non-oxide ceramics is less than 10% by mass based on 100% by mass representing the sum total of all the ceramic-constituting components. The oxygen content in the non-oxide ceramics may be measured by an oxygen and nitrogen simultaneous analyzer (Models EMGA-650FA, EMGA-920, etc. manufactured by HORIBA, Ltd.).

In the flow path member 10 according to the present disclosure, as shown in FIG. 2, an outer surface 1a of the substrate 1 is provided with a first oxide layer 8. The fulfillment of such a design allows the flow path member 10 according to the present disclosure to satisfactorily exhibit mechanical characteristics inherent in the non-oxide ceramics constituting the substrate 1. Thus, the flow path member 10 according to the present disclosure affords good mechanical characteristics. Note that the first oxide layer 8 is not shown in FIG. 1.

The attainment of good mechanical characteristics in the flow path member 10 according to the present disclosure is attributable to the fact that the outer surface 1a of the substrate 1 is provided with the first oxide layer 8, and more specifically, a microcrack present in the outer surface 1a is covered with the first oxide layer 8, whereby further propagation of the microcrack can be restrained even when the substrate 1 is subjected to a bending stress.

Moreover, in the flow path member 10 according to the present disclosure, since the outer surface 1a of the substrate 1 is provided with the first oxide layer 8, separation of particles lying within the microcrack is suppressed. Furthermore, in the presence of the first oxide layer 8, the outer surface 1a of the substrate 1 can be protected from exposure to a highly corrosive heat-exchange target and the consequent erosive damage. Hence, the flow path member 10 according to the present disclosure is suitable for use in applications where a reduction in particle contamination is required even with exposure to a highly corrosive heat-exchange target, such as a semiconductor manufacturing apparatus application.

When placing a heat-exchange target on the lid body 3, depending on the weight of the heat-exchange target, the lid body 3 is most susceptible to a bending stress. At this time, as shown in FIG. 2, when the first oxide layer 8 is provided on the outer surface 1a of the lid body 3, it is possible to attain mechanical characteristics superior to those obtainable in cases where the first oxide layer 8 is provided on an outer surface other than the lid body 3. Moreover, when the first oxide layer 8 is provided over the entire area of the outer surface 1a of the substrate 1, it is possible to attain excellent mechanical characteristics.

The following describes a way to ascertain whether the first oxide layer 8 is provided on the outer surface 1a of the substrate 1. First, X-rays with a specific energy (hv) are applied to the outer surface of the flow path member 10, which is defined as a measurement surface, by an XPS (X-ray Photoelectron Spectroscopy) analyzer. Then, the kinetic energy of photoelectrons ($E_{KIN}$) emitted from the measurement surface is measured to derive a binding energy with which the photoelectrons are bound by atoms ($E_B$=hv−$E_{KIN}$−φ). Since the value of binding energy is an atom-specific value, elements constituting the measurement surface can be identified. Moreover, the intensity of the emitted photoelectrons is proportional to element concentration, wherefore the concentrations of elements can be determined by XPS measurement.

Elements present in the range from the outer surface of the flow path member 10 to a location at a depth of several micrometers below the outer surface can be examined by alternately repeating the step of removing the surface of a sample by etching under Ar ion irradiation and the step of performing XPS measurement on a surface newly created by etching.

When the measurement result is that oxygen is observed in the direction from the surface of the flow path member 10 toward the substrate, and the concentration of oxygen is not less than 10%, then it can be judged that the first oxide layer 8 is provided on the outer surface 1a of the substrate 1. Note that the thickness of the first oxide layer 8 corresponds to a distance from the outer surface of the flow path member 10 to a location at a depth where the concentration of oxygen is less than 10% below the outer surface.

Moreover, in the flow path member 10 according to the present disclosure, as shown in FIG. 2, a second oxide layer 9 may be provided on an inner surface 1b of the substrate 1. When such a design is fulfilled, separation of particles when a fluid flows through the flow path 2 is reduced, and deterioration in mechanical characteristics is little, and therefore high reliability is attained. As described just above, since, in the flow path member 10 according to the present disclosure, particle separation is reduced, it is possible to minimize the likelihood of a failure in a circulating pump used for circulation of a fluid through the flow path 2. Moreover, when a highly corrosive fluid flows through the flow path 2, the presence of the second oxide layer 9 makes it possible to suppress erosive damage of the inner surface 1b of the substrate 1.

Whether the second oxide layer 9 is provided on the inner surface 1b of the substrate 1 can be ascertained by examining the inner surface of the flow path member 10, viz., the inner surface of the flow path 2, which is defined as a measurement surface, by a method similar to the above-described method for determination of the presence of the first oxide layer 8. When the measurement result is that oxygen is observed in the direction from the inner surface of the flow path 2 toward the substrate, and the concentration of oxygen is not less than 10%, then it can be determined that the second oxide layer 9 is provided on the inner surface 1b of the substrate 1. Note that the thickness of the second oxide layer 9 corresponds to a distance from the inner surface of the flow path 2 to a location at a depth where the concentration of oxygen is less than 10% below the inner surface.

Moreover, in the construction in which the first oxide layer 8 is provided on the outer surface 1a and the second oxide layer 9 is provided on the inner surface 1b, by making the first oxide layer 8 thicker than the second oxide layer 9, it is possible to attain high heat-exchange efficiency while ensuring high mechanical strength.

The attainment of high heat-exchange efficiency is attributable to the fact that the first oxide layer 8 is lower in thermal conductivity than the substrate 1 formed of non-oxide ceramics. That is, when heat from the heat-exchange target is applied to the first oxide layer 8, the heat tends to travel from the outer surface 1a toward the inner surface 1b rather than travel along the outer surface 1a.

On the other hand, in the construction in which the first oxide layer 8 is provided on the outer surface 1a and the second oxide layer 9 is provided on the inner surface 1b, by making the second oxide layer 9 thicker than the first oxide layer 8, it is possible to attain greater durability to withstand a bending stress, and high thermal reliability.

The attainment of greater durability to withstand a bending stress is attributable to the following grounds. For example, when placing a heat-exchange target on the lid body 3, depending on the weight of the heat-exchange target, a bending stress is applied to the substrate 1, and consequently the outer surface 1a is subjected to a compressive stress and the inner surface 1b is subjected to a tensile stress. Since to ceramics exhibits lower resistance to a tensile stress than to a compressive stress, cracking tends to occur in the inner surface 1b rather than in the outer surface 1a under the remaining bending stress. Hence, by making the second oxide layer 9 thicker than the first oxide layer 8, it is possible to suppress occurrence of cracking at the inner surface 1b, and thereby attain greater durability to withstand a bending stress.

Moreover, the reason why high thermal reliability can be attained is because, for example, when a heat-exchange target is at high temperature whereas a fluid flowing through the flow path 2 is at low temperature, then the inner surface 1$b$ undergoes an appreciable thermal difference resulting from heat exchange between the heat-exchange target and the fluid, and yet, the second oxide layer 9 is made thicker than the first oxide layer 8, and therefore it is possible to alleviate thermal shock caused by the described thermal difference.

A comparison between the thickness of the first oxide layer 8 and the thickness of the second oxide layer 9 may be attained by performing the above-described determination process for the first oxide layer 8 and the second oxide layer 9 and measuring the thicknesses of the first oxide layer 8 and the second oxide layer 9.

In the flow path member 10 according to the present disclosure, it is advisable that C2/C1 falls in a range of not less than 2 but not more than 10, wherein C1 denotes the concentration of oxygen in the first oxide layer 8 in the range from the surface of the first oxide layer 8 to a location toward the substrate 1 at a depth of 50 nm below the surface, and C2 denotes the concentration of oxygen in the second oxide layer 9 in the range from the surface of the second oxide layer 9 to a location toward the substrate 1 at a depth of 50 nm below the surface. When such a design is fulfilled, there is attained the flow path member 10 having both high durability to withstand a bending stress and high thermal reliability.

Moreover, in the flow path member 10 according to the present disclosure, the flow path 2 comprises: a discharge path connected to the outlet 7; and a flow passage located between the discharge path and the inlet 6, and, the thickness of the second oxide layer 9 in the flow passage may be made larger than the thickness of the second oxide layer 9 in the discharge path. As employed herein the discharge path refers to a part of the flow path 2 which extends from the outlet 7 to a location spaced away from the outlet 7 by a distance equivalent to one-fifth of the total flow path length of the flow path 2. On the other hand, the flow passage refers to other part of the flow path 2 than the discharge path, in other words, a part of the flow path 2 which extends from the inlet 6 to a location spaced away from the inlet 6 by a distance equivalent to four-fifths of the total flow path length of the flow path 2. When such a design is fulfilled, due to the second oxide layer 9 in the flow passage having a relatively large thickness, the flow path member 10 have high mechanical strength. Also, due to the second oxide layer 9 in the discharge path having a relatively small thickness, this makes it possible to promote heat transmission in the discharge path through which a fluid which is higher in temperature than a fluid flowing through the flow passage, flows, and to increase heat-exchange efficiency.

The following describes an exemplification of the method of manufacturing the flow path member 10 according to the present disclosure.

First, a slurry is prepared by suitably admixing a sintering aid, a binder, a solvent, a dispersant, etc. in powder of a primary constituent raw material (silicon carbide, silicon nitride, or aluminum nitride).

Next, ceramic green sheets are formed using the slurry by the doctor blade method. The ceramic green sheets may be prepared by granulating the slurry through a spray-drying process (spray-drying granulation) to prepare granules, and thereafter subjecting the granules thus obtained to a roll compaction process.

Next, the ceramic green sheets are punched with a punching die in conformity to the product shape. More specifically, for molded bodies which become the lid body 3 and the bottom plate 5, only the outer shape is punched out, whereas for molded bodies which become the intermediate plate 4, in addition to the outer shape, a portion which becomes the flow path 2 is punched out.

Then, the punched ceramic green sheets are laminated on top of each other to produce a molded body which is a laminated body. As another way of producing a molded body, by producing a molded body in block form by the cold isostatic pressing (CIP) method, and cutting the block, a molded body can be prepared in which a molded body which becomes the lid body 3 and a molded body which becomes the intermediate plate 4 and the bottom plate 5 are combined in unitary form.

Next, after applying a joining material to at least one of the contacting areas of the molded body which becomes the lid body 3 and the molded body which becomes the intermediate plate 4, as well as to at least one of the contacting areas of the molded body which becomes the intermediate plate 4 and the molded body which becomes the bottom plate 5, the molded bodies are stacked together under pressure. As the joining material, for example, it is possible to use can the above-described slurry.

Next, after being dried, the stack is fired in a certain atmosphere at a certain temperature that are determined in accordance with the type of the primary constituent raw material. More specifically, in the case of using silicon carbide as the primary constituent raw material, firing is performed in an atmosphere of an inert gas such as argon gas at a temperature of not lower than 1700° C. but not higher than 2200° C., whereas, in the case of using silicon nitride as the primary constituent raw material, firing is performed in an atmosphere of nitrogen at a temperature of not lower than 1600° C. but not higher than 1900° C.

Then, on an as needed basis, for the purpose of changing a surface texture, the stack is subjected to grinding operation to flatten the outer surface 1$a$ of the substrate 1, or blasting operation to roughen the outer surface 1$a$ of the substrate 1.

Next, as a heat treatment, the stack is retained in an air atmosphere at a temperature of not lower than 900° C. but not higher than 1200° C. for a duration of not shorter than 30 minutes, but not longer than 300 minutes. Such a heat treatment allows the first oxide layer 8 to be formed on the outer surface 1$a$ of the substrate 1. Note that, when in the production of the molded body, the inlet 6 and the outlet 7 in one of the molded bodies which become the intermediate plate 4 are formed by the cutting operation, and the above-described heat treatment is performed in such a manner that air enters a cavity portion which becomes the flow path 2 from the inlet 6 or the outlet 7, it is possible to form the second oxide layer 9 on the inner surface 1$b$ of the substrate 1.

Moreover, by performing the heat treatment in a state where only the inlet 6 is formed in the production of the molded body, oxidation of the cavity portion which becomes the flow path 2 is suppressed, and therefore it is possible to make the first oxide layer 8 thicker than the second oxide layer 9. In this case, the outlet 7 may be created through a cutting process following the completion of the heat treatment.

In addition, by forming the inlet 6 and the outlet 7 in the production of the molded body and supplying, at the time of the heat treatment, air from the inlet 6 so that an average flow velocity in the cavity portion is set to be 50 cm/min or above, it is possible to make the second oxide layer 9 thicker than the first oxide layer 8. In this method, as the retention time in the heat treatment is prolonged, oxidation proceeds at a faster pace in the cavity portion which becomes the flow path 2 than at the outer surface of the substrate 1. For example, in the case where the substrate 1 is formed of silicon carbide ceramics, the air flow velocity is set to 100 cm/min, and the heat treatment is performed at a temperature of 1000° C., by adjusting the retention time to be not shorter than 50 minutes but not longer than 200 minutes, it is possible to set the value representing C2/C1 to be not less than 2 but not more than 10.

The second oxide layer 9 can be made thicker than the first oxide layer 8 also by performing the heat treatment in a state where the outer surface 1a of the substrate 1 is covered with a dummy plate or powder formed of ceramics, and the inlet 6 and the outlet 7 are opened.

Moreover, when the inlet 6 and the outlet 7 are formed in the production of the molded body, and the heat treatment is performed so that air enters the cavity portion from the inlet 6 in a state where a part of the cavity portion which becomes a discharge path is covered with ceramic-made powder, it is possible to render the thickness of the second oxide layer 9 in the flow passage greater than the thickness of the second oxide layer 9 in the discharge path. In this case, following the completion of the heat treatment, the ceramic-made powder can be removed by cleaning the flow path 2.

In closing, it should be understood that the present disclosure is not limited to the embodiments as described heretofore, and various changes, modifications, and improvements are possible without departing from the scope of the present disclosure.

REFERENCE SIGNS LIST

1: Substrate
1a: Outer surface
1b: Inner surface
2: Flow path
3: Lid body
4: Intermediate plate
5: Bottom plate
6: Inlet
7: Outlet
8: First oxide layer
9: Second oxide layer
10: Flow path member

What is claimed is:

1. A flow path member, comprising:
   a substrate containing non-oxide ceramics, and comprising an outer surface;
   a flow path in the substrate, the flow path including an inlet and an outlet; and
   a first oxide layer disposed on the outer surface, wherein
   the substrate further comprises a lid body, a bottom plate located opposite to the lid body, and an intermediate plate located between the lid body and the bottom plate;
   the flow path is defined by a space surrounded by the lid body, the bottom plate, and the intermediate plate;
   the inlet and the outlet are provided as openings in the intermediate plate; and
   the first oxide layer is disposed on the outer surface including the lid body.

2. The flow path member according to claim 1, further comprising a second oxide layer disposed on an inner surface of the substrate, the inner surface constituting the flow path.

3. The flow path member according to claim 2, wherein the first oxide layer is thicker than the second oxide layer.

4. The flow path member according to claim 2, wherein the second oxide layer is thicker than the first oxide layer.

5. The flow path member according to claim 2, wherein C2/C1 is not less than 2 and not more than 10 where
   C1 denotes a concentration of oxygen of the first oxide layer at a depth of 50 nm from a first surface of the first oxide layer toward the substrate, and
   C2 denotes a concentration of oxygen of the second oxide layer at a depth of 50 nm from a second surface of the second oxide layer toward the substrate.

6. The flow path member according to claim 2, wherein the flow path comprises:
   a discharge path connected to the outlet; and
   a flow passage between the discharge path and the inlet, and
   the second oxide layer is thicker in the flow passage than in the discharge path.

7. The flow path member according to claim 1, wherein the non-oxide ceramics comprises silicon carbide ceramics.

* * * * *